United States Patent
Yamada et al.

(10) Patent No.: US 8,961,029 B2
(45) Date of Patent: Feb. 24, 2015

(54) ROLLER THRUST BEARING

(75) Inventors: Ryosuke Yamada, Gunma (JP); Tomoyuki Yokota, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/581,793

(22) PCT Filed: Feb. 2, 2012

(86) PCT No.: PCT/JP2012/052430
§ 371 (c)(1),
(2), (4) Date: Nov. 29, 2012

(87) PCT Pub. No.: WO2012/105662
PCT Pub. Date: Aug. 9, 2012

(65) Prior Publication Data
US 2013/0301974 A1 Nov. 14, 2013

(30) Foreign Application Priority Data

Feb. 2, 2011 (JP) ................ 2011-020927
Sep. 15, 2011 (JP) ................ 2011-201310

(51) Int. Cl.
*F16C 19/30* (2006.01)
*F16C 33/58* (2006.01)
*F16C 33/54* (2006.01)
*F16C 33/46* (2006.01)

(52) U.S. Cl.
CPC .............. *F16C 19/305* (2013.01); *F16C 19/30* (2013.01); *F16C 33/547* (2013.01); *F16C 33/4605* (2013.01); *F16C 33/588* (2013.01); *F16C 2361/61* (2013.01); *F16C 2240/60* (2013.01)

USPC ........... 384/621; 384/565; 384/572; 384/618; 384/623

(58) Field of Classification Search
CPC ........ F16C 19/30; F16C 19/46; F16C 19/305; F16C 33/46; F16C 33/54; F16C 33/60; F16C 33/58; F16C 33/583; F16C 33/547; F16C 33/588; F16C 35/067; F16C 43/06
USPC ......... 384/523, 565, 572, 585, 618, 620, 621, 384/623; 29/898.041
See application file for complete search history.

(56) References Cited

U.S. PATENT DOCUMENTS 3,994,546 A * 11/1976 Alling ........................ 384/623
4,310,205 A * 1/1982 Condon et al. ............. 384/620
(Continued)

FOREIGN PATENT DOCUMENTS

DE 3440961 C1 1/1986
DE 10305608 A1 8/2003
(Continued)

*Primary Examiner* — Marcus Charles
(74) *Attorney, Agent, or Firm* — Miles & Stockbridge P.C.

(57) ABSTRACT

Construction of a roller thrust bearing is achieved wherein it is possible to keep a thrust race from coming apart from a cage without wear or cracking occurring in a cage element and without impact occurring between the thrust race and cage even when used in an application wherein a rotating section rotates at high speed, or when used in an application wherein relative displacement between members of a rotating section is large. The thickness of metal plate of a first cage element 35 is preferably ⅚ the thickness of metal plate of a second cage element 36 or less. Alternatively, the thickness of metal plate of a second cage element 56 is preferably ⅚ the thickness of metal plate of a first cage element 55 or less.

8 Claims, 8 Drawing Sheets

(56) References Cited

U.S. PATENT DOCUMENTS

| | | | |
|---|---|---|---|
| 4,696,083 A | | 9/1987 | Olschewski et al. |
| 4,883,374 A | * | 11/1989 | Rhoads et al. ............... 384/618 |
| 4,910,847 A | * | 3/1990 | Christenson et al. .... 29/898.041 |
| 4,981,373 A | * | 1/1991 | Bando .......................... 384/620 |
| 5,110,223 A | * | 5/1992 | Koch et al. ................... 384/620 |
| 5,474,390 A | * | 12/1995 | Rhoads ......................... 384/623 |
| 5,647,675 A | * | 7/1997 | Metten et al. ................ 384/620 |
| 5,967,674 A | * | 10/1999 | Reubelt et al. ............... 384/620 |
| 6,520,685 B1 | * | 2/2003 | Urmaza ........................ 384/620 |
| 6,830,381 B2 | * | 12/2004 | Schwab et al. ............... 384/620 |
| 7,318,676 B2 | * | 1/2008 | Fugel et al. .................. 384/620 |
| 8,414,195 B2 | * | 4/2013 | Brown .......................... 384/618 |
| 2003/0161564 A1 | | 8/2003 | Kenney, Jr. |
| 2006/0193549 A1 | | 8/2006 | Fugel et al. |
| 2009/0016663 A1 | * | 1/2009 | Kadokawa et al. ........... 384/565 |

FOREIGN PATENT DOCUMENTS

| | | | |
|---|---|---|---|
| DE | 10306926 A1 | | 9/2004 |
| EP | 2672131 A1 | * | 12/2013 |
| FR | 2966893 A1 | * | 5/2012 |
| JP | 61-157827 | | 7/1986 |
| JP | 8-109925 A | | 4/1996 |
| JP | 2003-232364 A | | 8/2003 |
| JP | 2003-239989 A | | 8/2003 |
| JP | 2005-164023 A | | 6/2005 |
| JP | 2006-518023 A | | 8/2006 |
| JP | 2006242355 A | * | 9/2006 |
| JP | 2006283934 A | * | 10/2006 |
| JP | 2008075752 A | * | 4/2008 |
| JP | 2009191896 A | * | 8/2009 |
| JP | 2010-281406 A | | 12/2010 |
| WO | WO 2004/074702 A1 | | 9/2004 |
| WO | WO 2006109353 A1 | * | 10/2006 |

* cited by examiner

ROLLER THRUST BEARING

TECHNICAL FIELD

The present invention relates to an improvement of a roller thrust bearing that is assembled in a rotating section of the transmission of an automobile and the like, and supports thrust loads that are applied to this rotating section.

BACKGROUND ART

The roller thrust bearing (including the needle roller thrust bearing) such as disclosed in JP8-109925(A) is mounted in a rotating section of the transmissions or the like. The roller thrust bearing supports thrust loads that are applied to the rotating section. In this roller thrust bearing, the side surface in the axial direction of a pair of members rotating relative to each other may be used as is as the thrust raceway. However, when one or both of the members of this rotating section are made using a material for which it is difficult to maintain the necessary hardness, or, when it is difficult or troublesome to process the members to give the required smoothness to the surface, a roller thrust bearing that has one or two races assembled in the roller thrust bearing is used.

Figure 10:
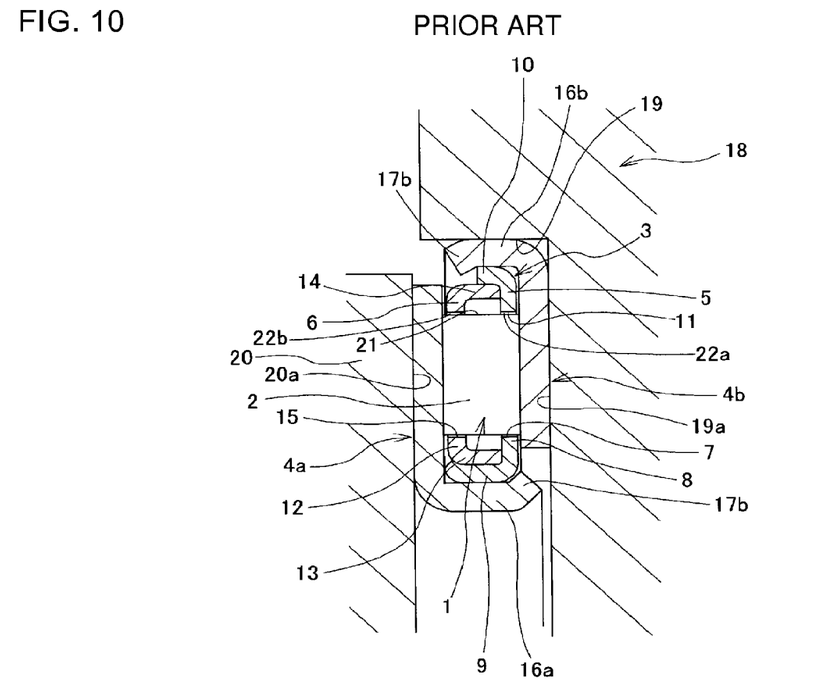
FIG. 10 is a partial cross-sectional view illustrating a first example of conventional construction.
Figure 11:
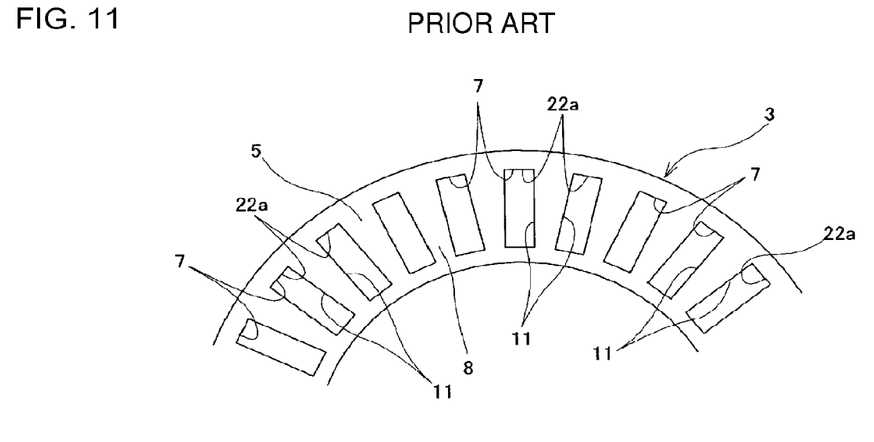
FIG. 11 is a partial side view of the cage of the first example of conventional construction as seen from the axial direction.

FIG. 10 and FIG. 11 illustrate an example of a roller thrust bearing with races. This roller thrust bearing 1 comprises a plurality of rollers 2 (including needles) that are arranged in a radial direction, a cage that holds these rollers 2, and a pair of thrust races 4a, 4b that hold these rollers 2 from both sides. The cage 3 is composed of a combination of a first cage element 5 and a second cage element 6 that are both formed into an annular disk shape having a U-shaped cross section, the combination having a hollow circular ring shape, and as illustrated in FIG. 11, has the same number of pockets 7 as the number of rollers 2 that are arranged radially.

The first cage element 5 is formed so that by performing plastic working such as pressing of a metal plate such as steel plate, a first inner-diameter side cylindrical section 9 and a first outer-diameter side cylindrical section 10 that extend in the axial direction are respectively connected to the inner circumferential edge and outer circumferential edge of a first annular disk section 8 that extends in the radial direction such that they are concentric. First through holes 11 that are long in the radial direction and rectangular for forming pockets 7 are formed at a plurality of locations in the circumferential direction of the first annular disk section 8. The second cage element 6 as well is formed such that by performing plastic working such as pressing of a metal plate such as steel plate, a second inner-diameter side cylindrical section 13 and a second outer-diameter side cylindrical section 14 that extend in the axial direction are respectively connected to the inner circumferential edge and outer circumferential edge of a second annular disk section 12 that extends in the radial direction such that they are concentric. Second through holes 15 that are long in the radial direction and rectangular for forming pockets 7 are formed at a plurality of locations in the circumferential direction of the second annular disk section 12. The first cage element 5 and the second cage element 6, with the first through holes 11 and the second through holes 15 aligned with each other in the axial direction, fit together such that the second outer-diameter side cylindrical section 14 fits inside the inner-diameter side of the first outer-diameter side cylindrical section 10, and the second inner-diameter side cylindrical section 13 fits around the outer-diameter side of the first inner-diameter side cylindrical section 9. Then, by bending the tip end edge of the first inner-diameter side cylindrical section 9 outward in the radial direction, the first cage element 5 and the second cage element 6 are prevented from coming apart from each other.

The thrust races 4a, 4b are both formed into an annular disk shape using a metal plate having sufficient hardness. Short cylindrical shaped flange sections 16a, 16b are formed around the inner circumferential edge of the one thrust race 4a that is typically called the inner ring (left race in FIG. 10), and around the outer circumferential edge of the other thrust race 4b that is typically called the outer ring (right race in FIG. 10). A plurality of locations on the tip end section of the flange section 16a located on the inside in the radial direction are bent outward in the radial direction, and a plurality of locations on the tip end section of the flange section 16b located on the outside in the radial direction are bent inward in the radial direction forming fastening sections 17a, 17b. These fastening sections 17a, 17b engage with the inner circumferential edge or outer circumferential edge of the cage 3, connecting the component parts of the roller thrust bearing 1 together so that do not come apart.

As illustrated in FIG. 10, a roller thrust bearing 1 that is constructed in this way is mounted in this rotating section by fitting the flange section 16b that is formed around the outer circumferential edge of the thrust race 4b inside a circular concave shaped supporting section 19 that is formed in the casing 18 and that is one member of the rotating section. In this state, the right surface of the thrust race 4b comes in contact with the rear surface 19a of the support section 19, and the left surface of the other thrust race 4a comes in contact with the end surface 20a of the opposing member 20 such as the rotating shaft, which is the other member of the rotating section. As a result, this opposing member 20 is supported so as to be able to rotate freely with respect to the casing 18, and a thrust load that acts between these members 18, 20 is supported. It is also possible for the rear surface 19a of the support section 19 of the casing 18 or the end surface 20a of the opposing member 20 to be used as the raceway, and to omit one or both of the thrust races 4a 4b.

When using this kind of roller thrust bearing 1, a force is applied to the rollers 2 in the radial direction of the cage 3 due to centrifugal force. This force presses the outer-diameter side end surfaces 21 of both the axial end surfaces of the rollers 2, which are located on the outside in the radial direction of the cage 3, against the outer-diameter side circumferential edge sections 22a, 22b of the circumferential edge sections of the first through holes 11 and second through holes 15 that form the pockets 7, which are located on the outside in the radial direction of the cage 3. However, the outer-diameter side end surfaces 21 are not necessarily pressed evenly against the outer-diameter side circumferential edge sections 22a, 22b. Actually, due to errors in manufacturing and displacement in the axial direction (left to right direction in FIG. 10) of the cage 3, the outer-diameter side end surfaces 21 are pressed against one of the outer-diameter side circumferential edge sections 22a, 22b, and the surfaces come in sliding contact with each other.

The surface pressure (P) at the area of sliding contact increases as the rotational speed of the roller thrust bearing 1 during use becomes faster and the centrifugal force becomes greater. Moreover, the area of sliding contact is located at a position that is separated from the center axis line of the rollers 2, so the sliding speed (V) between one of the outer-diameter side circumferential edges 22a, 22b and the outer-diameter side end surface 21 at the area of sliding contact becomes faster to some extent. In this way, the PV value, which is the product of the surface pressure (P) and the sliding speed (V) at the area of sliding contact and is widely known as a parameter that indicates the effect on wear, becomes large. As a result, depressions may be formed on one of the outer-diameter side circumferential edge sections 22a, 22b due to wear. As such depressions becomes large, the rollers 2 that are held in the pockets 7 slide to the rear sides of the first annular disk section 8 or second annular disk section 12 where these depressions are formed, and the rollers 2 are not able to roll smoothly. At the same time, the surface on the right side of the first cage element 5 is pressed against the side surface of the thrust race 4b, or the surface on the left side of the second cage element 6 is pressed against the side surface of the thrust race 4a, and the resistance to the cage 3 rotating relative to one of the thrust races 4a, 4b becomes large. As a result, not only does the efficiency of the mechanical device such as a transmission in which the roller thrust bearing 1 is assembled worsen, in extreme cases, there is a possibility that the mechanical device will not operate properly due to damage such as seizure.

As performance of recent automobiles improves, and the rotation speed of rotating sections such as a transmission becomes faster, wear that causes this kind of problem occurs more readily than in the past. Moreover, this kind of wear occurs more easily the greater the amount of displacement of the rollers 2 is inside the pockets 7. The displacement amount that the rollers 2 that are held inside the pockets 7 of the cage 3 displace in the axial direction (left-right direction in FIG. 10) becomes greater the larger the space is between the rolling surfaces of the rollers 2 and the inner circumferential edge of the pockets 7. In pockets 7 that allow the rollers 2 to displace a large amount, the rollers 2 easily displace, and the center of rotation of the rollers 2 no longer coincides with the radial direction of the cage 3, so it becomes easy for so-called skewing to occur. When skewing occurs, a component in the radial direction of the cage 3 occurs according to the direction of movement of the rollers 2 as the rollers 2 rotate. It is thought that when this component in the radial direction is toward the outside in the radial direction of the cage 3, the surface pressure (P) of the areas of sliding contact between the outer-diameter side end surface 21 and the outer-diameter side circumferential edge sections 22a, 22b becomes high together with the force due to centrifugal force, and wear occurs more easily.

JP2003-172346(A) discloses construction of a roller thrust bearing wherein on the outer-diameter side end section of the cage, metal plates form a pair of cage elements that overlap in the center section in the axial direction of the cage. With this construction, it is considered to be possible to prevent rollers from slipping into depressions due to the kind of wear described above. However, with this construction, the surface areas of the outer circumferential surface of the cage become small, and there is a possibility that the opposing surface that faces this outer circumferential surface will wear due to friction with this outer circumferential surface, so the sites where this construction can be applied are limited. Moreover, it is necessary to spot weld the location where the metal plates overlap, and because the construction differs greatly from the conventional construction, conventional equipment cannot be used, and therefore there is a possibility that the manufacturing cost will increase.

JP2002-206525(A) discloses construction of a roller thrust bearing that comprises a cage having a sheet of metal plate that are formed into a wave shape in cross section. With this construction, by adequately devising the location where to form the pockets, it is considered to be possible to prevent the roller from slipping into depressions due to wear such as described above. However, this construction as well, greatly differs from conventional construction, so it is not possible to obtain the effect of preventing the kind of wear described above using conventional equipment.

In regards to this, JP2005-164023(A) discloses a roller thrust bearing 1a having construction as illustrated in FIGS. 12A and 12B, with the object of preventing a reduction of dynamic torque and abnormal wear of the cage. The cage 3a of this improved roller thrust bearing 1a is also formed by combining a first cage element 5a and second cage element 6a into a hollow circular ring shape, and the same number of pockets 7 as rollers 2a are arranged in a radial fashion around the center of the cage 3a. In the radial direction of the cage 3a, both the outer-diameter side end surface 21a and the inner-diameter side end surface 23 of the rollers 2a are partial spherical surfaces having a center of curvature on the center axis of the rollers 2a, and the center sections of these surfaces protrude the most in the axial direction.

In the cage 3a of this improved roller thrust bearing 1a, in order to form pockets 7a, first through holes 11a are formed in a first annular disk section 8a of the first cage element 5a, and second through holes 15a are formed in a second annular disk section 12a of the second cage element 6a. Particularly, the second through holes 15a are open to the outer circumferential edge of the second annular disk section 12a. Then, with the rollers 2a held in the pockets 7a displaced as far as possible to the outside in the radial direction of the cage 3a, the center section of the outer-diameter side end surface 21a and the inner circumferential surface of the second outer-diameter side cylindrical section 14a of the second cage element 6a come in contact in the contact section 24 indicated by the small dashed-line circle mark in FIG. 12B. The sliding speed (V) of the center section that corresponds with the contact section 24 is low, so the PV value at the contact section 24 is kept low, and the friction resistance and wear at the contact section between the center section of the outer-diameter side end surface 21a and the inner circumferential surface of the second outer-diameter side cylindrical section 14a are kept negligible. This improved roller thrust bearing 1a is advantageous from the aspect of reducing the rotation resistance (dynamic torque) and improvement of durability, however, when a roller thrust bearing with races is constructed using a combination of this construction and thrust races, there is room for improvement when considering preventing the cage 3a from coming apart from the thrust race 4b, and maintaining smooth, relative rotation between the cage 3a and the thrust race 4b.

Figure 12:
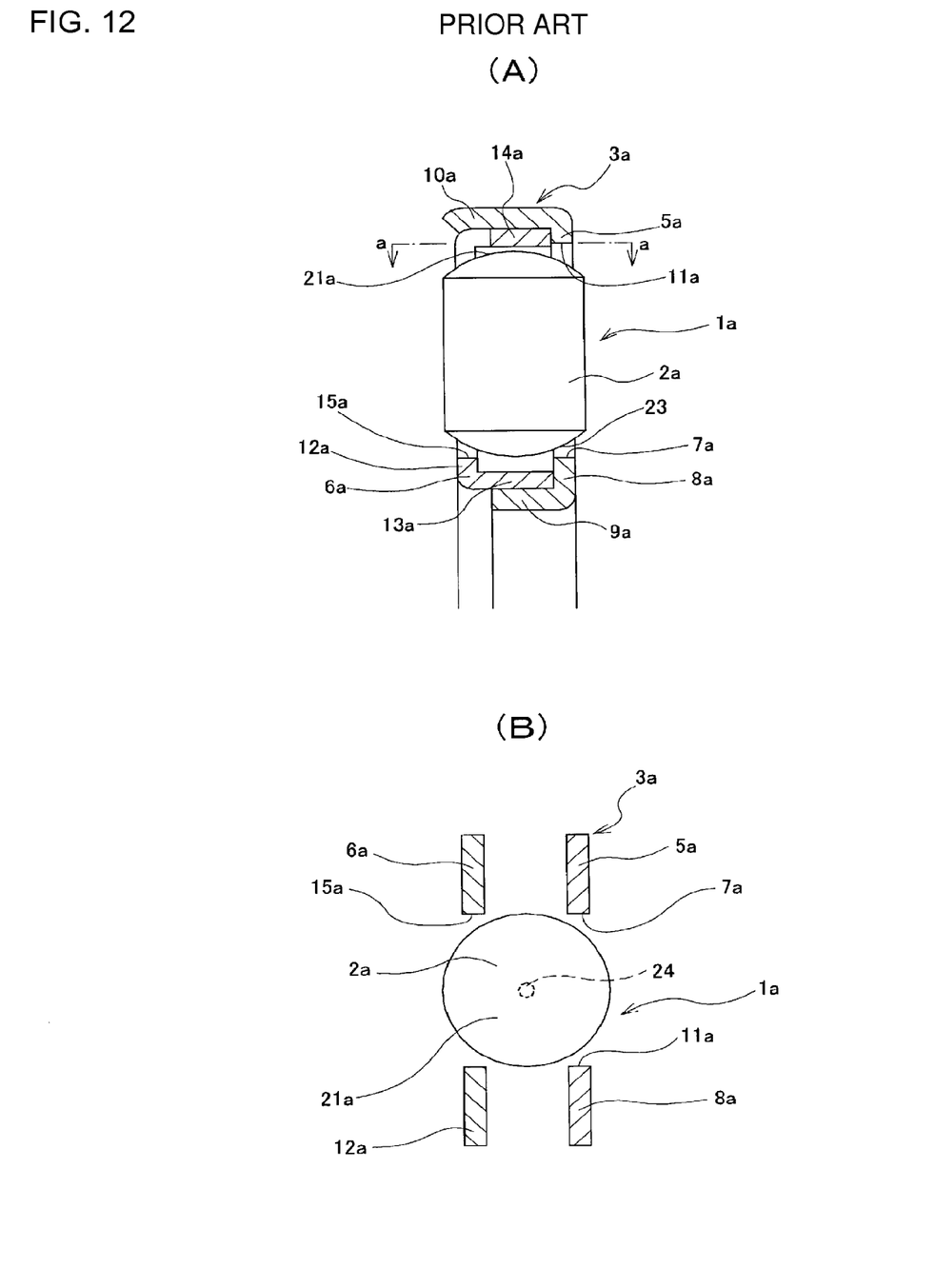
FIG. 12A is a partial cross-sectional view illustrating a second example of conventional construction.
FIG. 12B is a cross-sectional view of section a-a in FIG. 12A.
Figure 13:
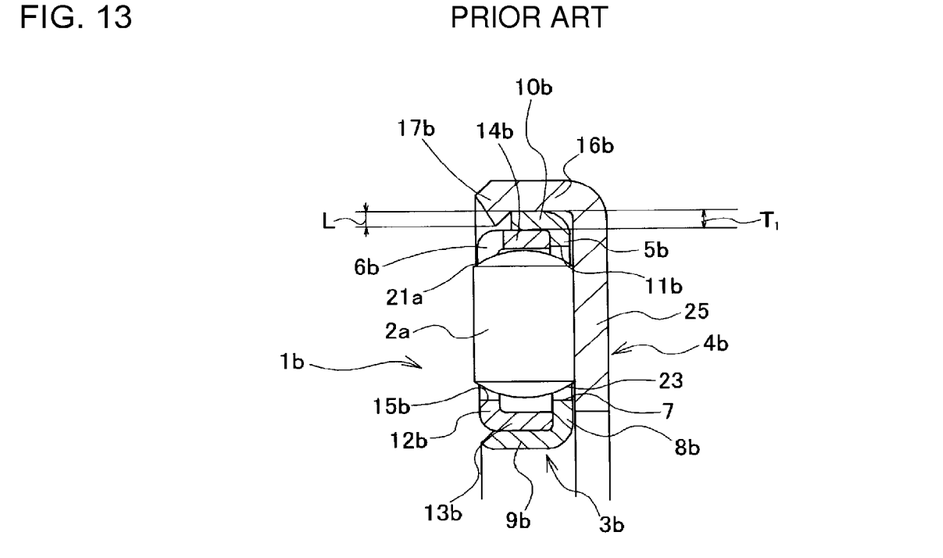
FIG. 13 is a partial cross-sectional view of construction wherein the roller thrust bearing of a second example of conventional construction is simply combined with a conventional thrust race.

FIG. 13 illustrates simple combined construction of combining an improved roller thrust bearing 1a having construction similar to that illustrated in FIG. 12 with the thrust race 4b illustrated in FIG. 10. In this construction, the first annular disk section 8b of the first cage element 5b of the roller thrust bearing 1b faces the race section 25 of the thrust race 4b. In order to prevent the thrust race 4b from coming apart from the cage 3b, the plurality of fastening sections 17b that are formed on the flange section 16b of the thrust race 4b are located further on the opposite side in the axial direction from the race section 25 than the tip end edge of the first outer-diameter side cylindrical section 10b of the first cage element 5b. Furthermore, the protruding amount (L) that each of the fastening sections 17b protrudes from the inner circumferential surface of the flange section 16b is less than the thickness ($T_1$) of the first outer-diameter side cylindrical section 10b ($L < T_1$).

In the case of this construction, as long as the thickness ($T_1$) of the first outer-diameter side cylindrical section 10b is sufficiently large, it is possible to maintain the protruding amount (L) of the fastening sections 17b, and thus it is possible to sufficiently maintain the engagement amount (amount of overlap in the radial direction) of the fastening sections 17b and the tip end section of the first outer-diameter side cylindrical section 10b of the cage 3b, and it is possible prevent the thrust race 4b from coming apart from the cage 3b. However, in this roller thrust bearing 1b, the thicknesses of the metal plates of the pair of cage elements 5a, 6b of the cage 3b are the same as each other, so it depending on the size of the roller thrust bearing with races, and particularly depending thickness dimension in the axial direction, it becomes difficult to maintain the thickness of the first outer-diameter side cylindrical section 10b while at the same time maintain the strength and rigidity of the cage 3b.

For example, the problem becomes very evident when the thickness in the axial direction of the overall roller thrust bearing with races, which is the total of the thickness of the thrust race 4b and the diameter of the roller 2a, is 2.5 to 6 mm. In other words, when taking into consideration maintaining strength and rigidity of the cage when this thickness in the axial direction is 6 mm or less, the thickness of the first outer-diameter side cylindrical section 10b becomes fairly small, and the engagement amount of the fastening sections 17b and the tip end section of the first outer-diameter side cylindrical section 10b becomes too small, so it becomes uncertain whether the thrust race 4b and cage 3b can be kept from coming apart. When the thickness in the axial direction is less than 2.5 mm, the thickness dimensions of all parts become too small, so an applicable roller thrust bearing with races cannot be achieved.

Figure 14:
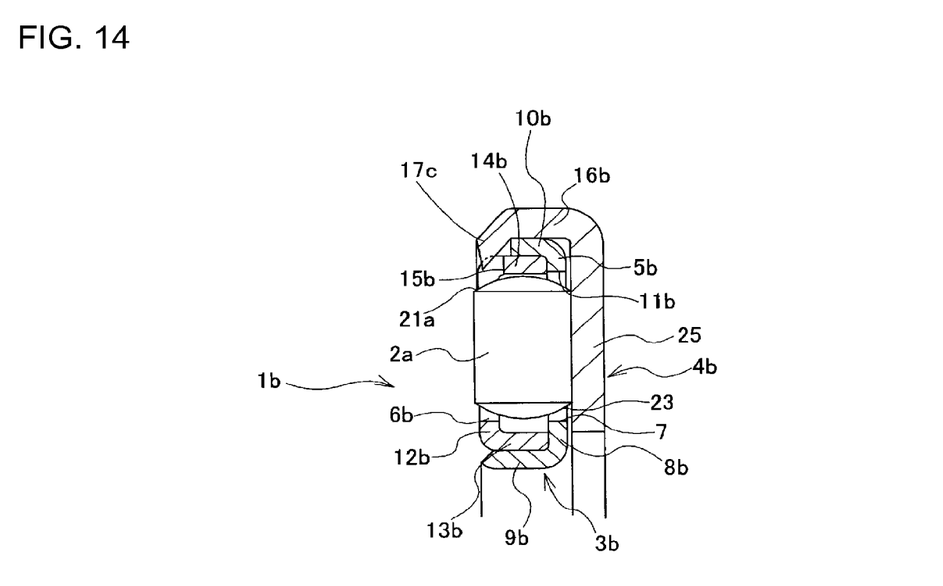
FIG. 14 is a partial cross-sectional view for explaining the problems in the case of the construction illustrated in FIG. 13.

As illustrated in FIG. 14, by making the protruding amount of the fastening sections 17c large regardless of the thickness of the first outer-diameter side cylindrical section 10b, it is possible to prevent the thrust race 4b from coming apart from the cage 3b, however, instead, the tip end sections of the fastening sections 17c interfere with the outer circumferential edge section of the second cage element 6b. The outer circumferential edge section of the second cage element 6b is gear shaped (concavo-convex shaped) due to the end sections of the second through holes 15b that are uniformly spaced in the circumferential direction. Therefore, not only does severe vibration occur due to the interference in this area, but also rotation resistance and wear become extreme.

By forming an engagement section for preventing separation from the cage by bending the tip end section of the flange section of the thrust race around the entire circumference, the edge on the end of this engagement section is smooth in the circumferential direction. However, when an error is made in the assembly direction of the thrust bearing with a race, a problem occurs in that durability is lost due to insufficient lubrication, so in order to prevent reverse assembly in which this problems occurs, it is necessary to provide a plurality of protruding sections for preventing reverse assembly that protrude outward in the radial direction on the tip end edge of the flange section of the thrust race; however, in this construction, it is not possible to form such protrusions for preventing reverse assembly. Therefore, as construction for preventing reverse assembly, construction in which the outer diameter of the thrust race 4a (see FIG. 10) is greater than the outer diameter of the thrust race 4b and the inner diameter of the supporting section 19 of the casing 18 is possible. However, in this construction, due to the outer diameter of the thrust race 4a becoming large, there are disadvantages such as the weight of the thrust race 4a increasing, construction of the assembly section being limited, the flow path area for the lubrication being narrow, and the like.

Furthermore, the roller thrust bearing 1, and the roller thrust bearing with races having a combined pair of thrust races 4a, 4b may be applied to an application such as when the relative eccentricity between the two members that are composed of a rotating section and support the thrust bearing with races becomes large. In this case, when this amount of relative eccentricity is greater than the space inside the bearing, or in other words, the space between the outer circumferential surface of the first outer-diameter side cylindrical section 10 of the first cage element 5 and the inner circumferential surface of the flange section 16b of the thrust race 4b, or the space between the inner circumferential surface of the first inner-diameter side cylindrical section 9 of the first cage element 5 and the outer circumferential surface of the flange section 16a of the thrust race 4a, interference occurs between the one of the thrust races 4a, 4b and the first cage element 5, and due to this interference, there is a problem with wear occurring in the first cage element 5. The edge on the tip end of the first inner-diameter side cylindrical section 9 of the first cage element 5 is crimped and fastened to the second inner-diameter side cylindrical section 13 of the second cage element 6, however, the tip end edge of the first outer-diameter side cylindrical section 10 of the first cage element 5 is not crimped, and there is a possibility that a small space will occur between that edge and the second outer-diameter side cylindrical section 14 of the second cage element 6. In this case, contact between the first outer-diameter side cylindrical section 10 and the thrust race 4b will cause bending to occur in the first outer-diameter side cylindrical section 10, and the round section on the inside of the connecting section between the first annular disk section 5 and the first outer-diameter side cylindrical section 10 becomes an area of concentrated stress, and thus there is a possibility that cracking will occur in the first cage element 5.

RELATED LITERATURE

Patent Literature

[Patent Literature 1] JP8-109925(A)
[Patent Literature 2] JP2003-172346(A)
[Patent Literature 3] JP2002-206525(A)
[Patent Literature 4] JP2005-164023(A)
[Patent Literature 5] JP11-247868
[Patent Literature 6] JP1-67328

SUMMARY OF THE INVENTION

Problem to be Solved by the Invention

Taking into consideration the problems described above, the object of the present invention is to provide a roller thrust bearing for which it is possible to use existing equipment for manufacturing the roller thrust bearing, and that is capable of effectively preventing wear of the inner circumferential edge of the pockets provided in the cage of the roller thrust bearing even when used in applications where the rotating section rotates at high speed. Alternatively, the object of the present invention is to provide a roller thrust bearing that is capable of effectively preventing wear in the first outer-diameter side cylindrical section of the first cage element of the cage and preventing cracking in the continuous section between the first outer-diameter side cylindrical section and the first annular disk section of the cage even when the bearing is used in applications where the relative displacement amount between members of the rotating section is large.

Moreover, another object of the present invention is to provide a roller thrust bearing with races, in which a roller thrust bearing is combined with thin thrust races having a small thickness in the axial direction and for which it is difficult to make the thickness dimension of the metal plate of the cage large, that is capable of obtaining a sufficient effect of preventing the thrust races from coming apart from the cage, and in which there is no harmful interference between the thrust races and the cage.

Means for Solving the Problems

A roller thrust bearing of a first aspect of the present invention has a cage and a plurality of rollers. The cage has a first cage element that is formed by bending a metal plate and a second cage element that is formed by bending a metal plate. The first cage element has a first annular disk section in which first through holes that are long in the radial direction are formed at a plurality of locations in the circumferential direction thereof; a first inner-diameter side cylindrical section that is formed around the inner circumferential edge of the first annular disk section; and a first outer-diameter side cylindrical section that is formed around the outer circumferential edge of the first annular disk section. The second cage element has a second annular disk section in which second through holes that are long in the radial direction are formed at a plurality of locations in the circumferential direction thereof so as to have the same pitch as the first through holes; a second inner-diameter side cylindrical section that is formed around the inner circumferential edge of the second annular disk section; and a second outer-diameter side cylindrical section that is formed around the outer circumferential edge of the second annular disk section. The cage is constructed of the first cage element and the second cage element that are combined together in the axial direction such that the first through holes and second through holes are aligned in the axial direction, the second outer-diameter side cylindrical section fits inside the inner-diameter side of the first outer-diameter side cylindrical section, and the second inner-diameter side cylindrical section fits around the outer-diameter side of the first inner-diameter side cylindrical section. Each of the rollers is placed respectively in a plurality of pockets that is formed by the first through holes and second through holes of the cage so as to be able to roll freely.

Particularly, in the roller thrust bearing of the present invention, the thickness of the metal plate of the first cage element is different than the thickness of the metal plate of the second cage element. More specifically, the thickness of the metal plate of the first cage element being less than the thickness of the metal plate of the second cage element, or the thickness of the metal plate of the second cage element is less than the thickness of the metal plate of the first cage element.

Normally, the thicknesses of the metal plates of these cage elements are adjusted, however, when possible, the same effect can be obtained by making the thicknesses of the first annular disk section and the second annular disk section the same, and making the thickness of the first inner-diameter side cylindrical section and first outer-diameter side cylindrical section of the first cage element less than the thickness of the second inner-diameter side cylindrical section and the second outer-diameter side cylindrical section of the second cage element, or making the thickness of the second inner-diameter side cylindrical section and second outer-diameter side cylindrical section of the second cage element less than the thickness of the first inner-diameter side cylindrical section and first outer-diameter side cylindrical section of the first cage element.

Preferably, at least one end surface of two end surfaces in the axial direction of each of the rollers which is located on the outer-diameter side of the cage is a partial spherical shaped convex surface whose center of curvature is located on the center axis of the rollers, the second through holes in the second cage element are formed up to the outer circumferential edge of the second annular disk section, and when the rollers are displaced outwardly in the radial direction of the cage, only the center section of the outer-diameter side end surface of these rollers comes in contact with the inner circumferential surface of the second outer-diameter side cylindrical section.

In the first aspect of the roller thrust bearing of the present invention, the thickness of the metal plate of the first cage element is preferably within the range of ⅝ to ½ the thickness of the metal plate of the second cage element, and more preferably ⅔ the thickness of the metal plate of the second cage element or less.

A second aspect of the present invention relates to a roller thrust bearing with a race. The roller thrust bearing with a race has at least one thrust race in conjunction with the roller thrust bearing of the present invention. The at least one thrust race is assembled so as to be able to rotate freely relative to the cage, and so as not to come apart from the cage. The at least one thrust race is formed by bending a hard metal plate and has an annular disk shaped race section; a cylindrical shaped flange section that is formed around the outer circumferential edge of this race section; and fastening sections that are formed so as to protrude inward in the radial direction from a plurality of locations in the circumferential direction around the tip end edge of the flange section, the diameter of the inscribed circle thereof being less than the outer diameter of the cage.

Particularly, in the roller thrust bearing with a race of the present invention, preferably, the first annular disk section of the first cage element faces the race section of the at least one thrust race, and the fastening sections are located further on the opposite side in the axial direction from the race section than the tip end edge of the first outer-diameter side cylindrical section of the first cage element. Moreover, the thickness of the metal plate of the second cage element is ⅝ or less than the thickness of the metal plate of the first cage element, and the protrusion amount that the fastening sections protrude from the inner circumferential surface of the flange section is less than the thickness of the first outer-diameter side cylindrical section. More preferably, the thickness of the metal plate of the second cage element is ⅔ the thickness of the metal plate of the first cage element or less, and even more preferably ½ or less.

Preferably, a plurality of protrusions that protrude outward in the radial direction and that are for preventing reverse assembly are provided at a plurality of locations in the circumferential direction of the tip end edge of the flange section such that the phase in the circumferential direction thereof is separated from that of the fastening sections.

The present invention can be suitably applied to a roller thrust bearing wherein the total of the thickness of the thrust race and the diameter of the roller is in the range from 2.5 mm to 6 mm.

Effect of the Invention

In the present invention, the cage elements are not made using metal plate having the same thickness as was done conventionally, instead the thickness of the first cage element and second cage element are different at least in the cylindrical sections, so that even when the roller thrust bearing is applied to uses where the rotating section rotates at high speed, or in uses where the relative amount of displacement between members of the rotating section is large, it is possible to effectively prevent the occurrence of wear or cracking in these cage elements of the cage. In other words, the strength and rigidity that are required for the cage are maintained by the thickness of the metal plate of one of the cage elements being made thick, and it is possible to keep the thickness dimension of the metal plate of the other cage element small. As a result, it is possible to strengthen the resistance against wear or cracking of the cage elements without increasing the dimension in the axial direction and the dimension in the radial direction of the overall cage. The thickness of which cage element is to be increased is determined according to the usage.

In either case, by making at least the outer-diameter side end surface of the end surfaces of the rollers a partial spherical convex surface and extending the second through holes of the second cage element up to the outer circumferential edge of the second annular disk section, rubbing between these members is prevented, and even when the rollers have displaced outward in the radial direction of the cage, only the center section of the outer-diameter side end surface of the rollers comes in contact with the inner circumferential surface of the second outer-diameter side cylindrical section, and even when these surfaces rub, the PV value at the area of sliding contact is kept low.

By making the thickness of the metal plate of the second cage element thicker in uses where the rotating section rotates at high speed, resistance to wear in the second cage element is provided, so even when there is rubbing between the second cage element and the outer-diameter side end surfaces of the rollers, wear in the second cage element is effectively suppressed.

Moreover, in the roller thrust bearing with race of the present invention, by having a plurality of fastening sections that are formed on the tip end section of the flange section of the thrust race engaging with the tip end edge of the first outer-diameter side cylindrical section of the first cage element, it is possible to prevent the cage and the thrust race from coming apart. Particularly, in the present invention, the thickness of the metal plate of the first cage element is greater than the thickness of the metal plate of the second cage element. As a result, it is possible to maintain the thickness in the radial direction of the first outer-diameter side cylindrical section of the first cage element that engages with the fastening sections without increasing the dimension in the axial direction and the dimension in the radial direction of the overall cage. Moreover, this construction can be suitably applied to uses wherein the relative eccentricity between members of the rotating section becomes large. In other words, even though there may be active interference between the flange section of the thrust race and the first outer-diameter side cylindrical section or first inner-diameter side cylindrical section, the resistance to wear of these cylindrical sections is improved, so wear of these cylindrical sections is effectively suppressed. Furthermore, even when bending occurs in the cylindrical section that does not have crimping due to that cylindrical section coming in contact with the thrust race, the amount of bending is reduced, concentrated stress in the continuous section between this cylindrical section and the annular disk sections is reduced, and cracking of these cylindrical sections is effectively prevented.

MODES FOR CARRYING OUT THE INVENTION

Embodiment 1, Example 1

Figure 1:
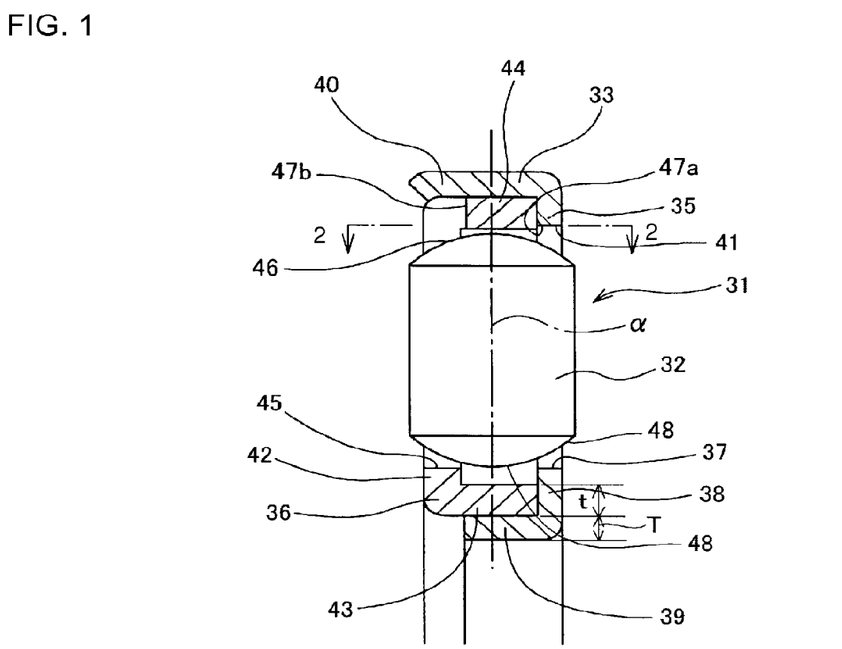
FIG. 1 is a partial cross-sectional view illustrating a first example of a first embodiment of the present invention.
Figure 2:
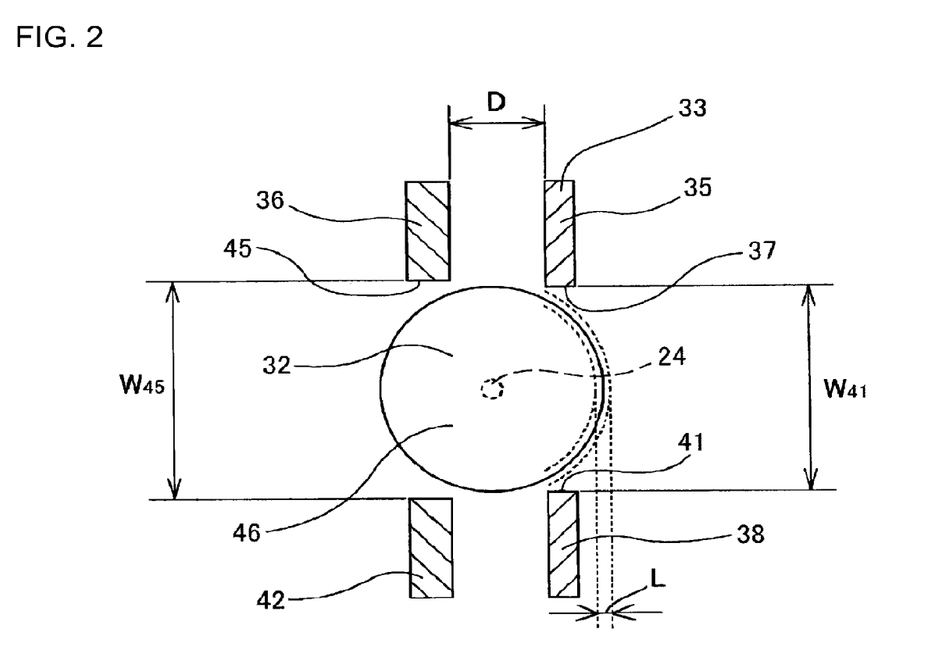
FIG. 2 is a cross-sectional view of section 2-2 in FIG. 1.

FIG. 1 and FIG. 2 illustrate a first example of a first embodiment of the present invention. The cage 33 of the roller thrust bearing 31 of this example comprises a first cage element 35 and a second cage element 36 that are both formed into an annular disk shape as a whole having a U-shaped cross section, and combined to form a hollow circular ring shape, and the same number of pockets 37 as number of rollers 32 are arranged in a radial fashion around the center of the cage 33. The outer-diameter side end surface 46 and the inner-diameter side end surface 48 of the rollers 32 in the radial direction of the cage 33 are both spherical convex surfaces having a center of curvature on the center axis α of these rollers 32. Therefore, the center section of both the outer-diameter side end surface 46 and the inner-diameter side end surface 48 protrudes the most in the axial direction.

Both the first cage element 35 and the second cage element 36 are formed by performing plastic working such a pressing of metal plate like steel plate or stainless steel plate. The first cage element 35 comprises a first annular disk section 38, a first inner-diameter side cylindrical section 39 that is formed by bending from the inner circumferential edge of the first annular disk section 38 to one side in the axial direction, and a first outer-diameter side cylindrical section 40 that is formed by bending from the outer circumferential edge of the first annular disk section 38 to one side in the axial direction so as to be concentric with the first inner-diameter side cylindrical section 39. First through holes 31 that are rectangular and long in the radial direction are uniformly spaced at a plurality of locations in the circumferential direction of the first annular disk section 38 to form pockets 37. The second cage element 36 comprises a second annular disk section 42, a second inner-diameter side cylindrical section 43 that is formed by bending from the outer circumferential edge of the second annular disk section 42 to one side in the axial direction, and a second outer-diameter side cylindrical section 44 that is formed by bending from the outer circumferential edge of the second annular disk section 42 so as to be concentric with the second inner-diameter side cylindrical section 43. Second through holes 31 that are rectangular and long in the radial direction are uniformly spaced at a plurality of locations in the circumferential direction of the second annular disk section 42 to form pockets 37.

In this example, the thickness (T) of the metal plate of the first cage element 35 is less than the thickness (t) of the metal plate of the second cage element 36 (T<t). More specifically, the thickness (T) of the metal plate of the first cage element 35 is set in within a range of $5/6$ to $½$ the thickness (t) of the second cage element 36 (T=($5/6$ to $½$)t, or t=(1.2 to 2)T). For example, the thickness (T) of the metal plate of the first cage element 35 can be taken to be 0.4 mm and the thickness (t) of the metal plate of the second cage element 36 can be taken to be 0.5 mm. However, as long as the strength and rigidity necessary for the first cage element 35 can be ensured, preferably the thickness dimension of the second cage element 36 is made as large as possible. Furthermore, it is possible to set the thickness (T) of the metal plate of the first cage element 35 so as to be $½$ or less the thickness (t) of the metal plate of the second cage element 36. Moreover, as necessary, instead of this kind of relationship between the overall metal plates of the first cage element 35 and the second cage element 36, it is possible to make the thickness dimensions of the first annular disk section 38 and the second annular disk section 42 the same, and to make just the relationship between the thickness dimensions of the first inner-diameter side cylindrical section 39 and the second inner-diameter side cylindrical second 43, and the relationship between the thickness dimensions of the first outer-diameter side cylindrical section 40 and the second outer-diameter side cylindrical section 44 differ within the range above. Furthermore, it is also possible for the thickness dimensions of both the first annular disk section 38 and second annular disk section 42, and the thickness dimension of the first inner-diameter side cylindrical section 40 and the second inner-diameter side cylindrical section 43 to be the same, and for only the relationship between the thickness dimensions of the first outer-diameter side cylindrical section 40 and the second outer-diameter side cylindrical section 44 differ within the range above.

With the first through holes 31 and the second through holes 45 aligned with each other in the axial direction, the first cage element 35 and second cage element 36 are combined by fitting the second outer-diameter side cylindrical section 44 inside the inner-diameter side of the first outer-diameter side cylindrical section 40, and fitting the second inner-diameter side cylindrical section 43 around the outer-diameter side of the first inner-diameter side cylindrical section 39, so as to form the cage 33. By tightly fastening together these cylindrical sections, or by bending the edge on the tip end of the first outer-diameter side cylindrical section 40 inward in the radial direction, these cylindrical sections are prevented from coming apart.

In this example, when compared with conventional construction, the first through holes 38 and the second through holes 45 are formed in the portion near the outside in the radial direction of the first annular disk section 38 and second annular disk section 42. Therefore, in this example, the second through holes 45 are open up to the outer circumferential edge of the second annular disk section 42. When the rollers 32 that are held in the pockets 37 are displaced toward the furthest outside in the radial direction of the cage 33, the center section of the outer-diameter side end surface 46 of the rollers 32 comes in contact with the inner circumferential surface of the second outer-diameter side cylindrical section 44. Moreover, by suitably regulating the space (D) between the first annular disk section 38 and the second annular disk section 42, the width ($W_{41}$) of the first through holes 41 in the circumferential direction of the cage 33, and the width ($W_{45}$) of the second through holes 45 in the circumferential direction of the cage 33, the displacement amount (L) of the rollers 32 inside the pockets 37 in the axial direction (left and right direction in FIG. 1 and FIG. 2) of the cage 33 is kept to 0.7 mm or less for all rollers 32 in all pockets 37, while the rollers 32 freely roll (rotate) in the pockets 37. This displacement amount (L), as illustrated by the dashed line in FIG. 2, is represented by the difference between the displacement amount when the roller 32 protrudes a maximum amount from the right surface of the first annular disk section 38, which is the reference surface, and the displacement amount when the roller 32 protrudes a minimum amount from the reference surface, or is represented by the sum of the displacement amount when the roller 32 protrudes a maximum amount from the reference surface and the displacement amount when the roller 32 withdraws a maximum amount from the reference surface.

In this example, so-called roller riding construction in which the displacement in the axial direction of the cage 33 is regulated by edge section of the pockets 37 and the rolling surfaces of the rollers 32, is preferred. By employing roller riding construction, it is possible to effectively prevent skew of the rollers 32. When roller riding construction is employed, part of the rollers 32 is always in a state of protruding from the end surfaces on both ends in the axial direction of the cage 33. Therefore, as described above, the displacement amount (L) in the axial direction of the cage 33 is expressed as the difference between the displacement amount when the roller 32 protrudes a maximum amount from the reference surface, and the displacement amount when the roller 32 protrudes a minimum amount from the reference surface.

In the roller thrust bearing 31 of this example, rubbing between the outer-diameter side end surface 46 of the rollers 32 and the outer-diameter side circumferential edge sections 47a, 47b, which are the edge sections of the circumferential edges of the first through holes 41 and the second through holes 45 of the pockets 37 that are on the outside in the radial direction of the cage 33, is prevented. Moreover, even in the case where there is rubbing, it is possible to keep the PV value at the area of sliding contact low. In other words, by the center section of the outer-diameter side end surface 46 of the rollers 32 coming in contact with the inner circumferential surface of the second outer-diameter side cylindrical section 44 at the area of contact 24 that is illustrated by the small dashed circle in FIG. 2, rubbing between the portion separated from the center of the outer-diameter side end surface 46 of the rollers 32 and the circumferential edge section of the first through holes 41 and second through holes 45 is prevented. The sliding velocity (V) of the center section that corresponds to this area of contact is low, so the PV value is kept low, wear at the area of contact between the center section of the outer-diameter side end surface 46 and the inner circumferential surface of the second outer-diameter side cylindrical section 44 is kept to an insignificant amount. Furthermore, the thickness (t) of the metal plate of the second cage element 36 is set to be thick, so resistance to wear is provided to the inner circumferential surface of the second outer-diameter side cylindrical section 44 of the second cage element 36.

Moreover, in this example, the displacement amount (L) of the rollers 32 is kept to 0.7 mm or less, so displacement of the rollers inside the pockets 37 is suppressed. As a result, large skew of these rollers 32 is also prevented. Therefore, supposing that the outer-diameter side end surface 46 comes close to the outer-diameter side circumferential edge sections 47a, 47b, and rubbing occurs between the outer-diameter side end surface 46 and the outer-diameter side circumferential edge sections 47a, 47b due to skew of the rollers 32, the surface pressure (P) at these areas of contact is kept from becoming high. By suppressing a rise in the PV value at the areas of contact in this way, the occurrence of wear that would allow the rollers 32 to slip into depressions in the outer-diameter side edge sections 47a, 47b of the first through holes 41 and second through holes 45 is prevented.

Furthermore, in this example, it is possible to existing equipment used for manufacturing a cage having conventional construction. Therefore, it is possible to greatly suppress associated manufacturing costs. As long as construction is such that the center section of the outer-diameter side end surface 46 of the rollers 32 comes in contact with the inner circumferential surface of the second outer-diameter side cylindrical section 44 at the area of contact 24, it is not absolutely necessary to suppress the displacement amount (L) to 0.7 mm or less. On the other hand, when the displacement amount (L) is kept to 0.7 mm or less, it is not absolutely necessary for the center section of the outer-diameter side end surface 46 of the rollers 32 to come in contact with the inner circumferential surface of second outer-diameter side cylindrical section 44 at the area of contact 24. Furthermore, in this example, even when the relationship between the thickness dimensions of the first cage element 35 and the second cage element 36 is applied in the conventional construction illustrated in FIG. 10, it is possible to obtain the effect of improving the resistance to wear of the second outer-diameter side cylindrical section 44 of the second cage element 36.

Embodiment 1, Example 2

Figure 3:
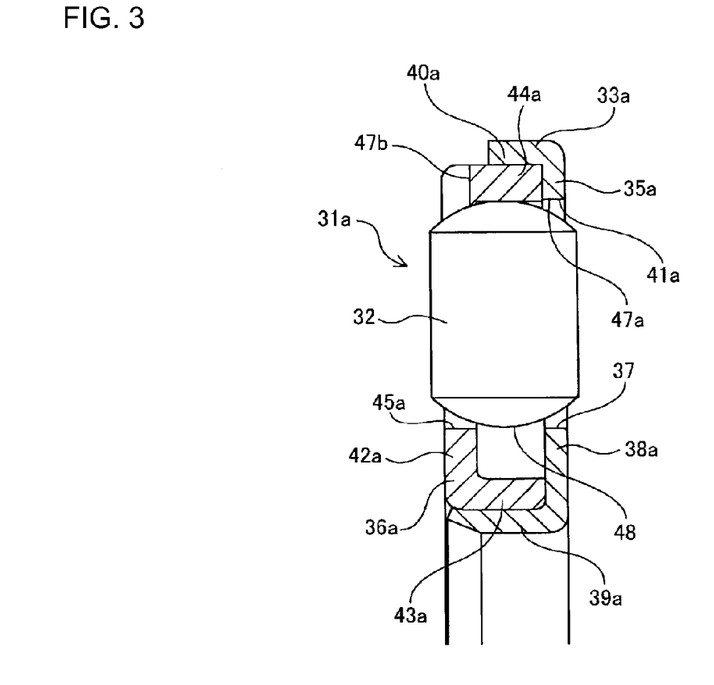
FIG. 3 is a partial cross-sectional view illustrating a second example of the first embodiment of the present invention.

FIG. 3 illustrates a second example of a first embodiment of the present invention. In this example, in order to join the first cage element 35a and the second cage element 36a of the cage 33a so as not to come apart, the tip end edge of the first inner-diameter side cylindrical section 39a is bent outer in the radial direction. The construction and function of the other parts are the same as in the first example of the first embodiment.

Embodiment 1, Example 3

Figure 4:
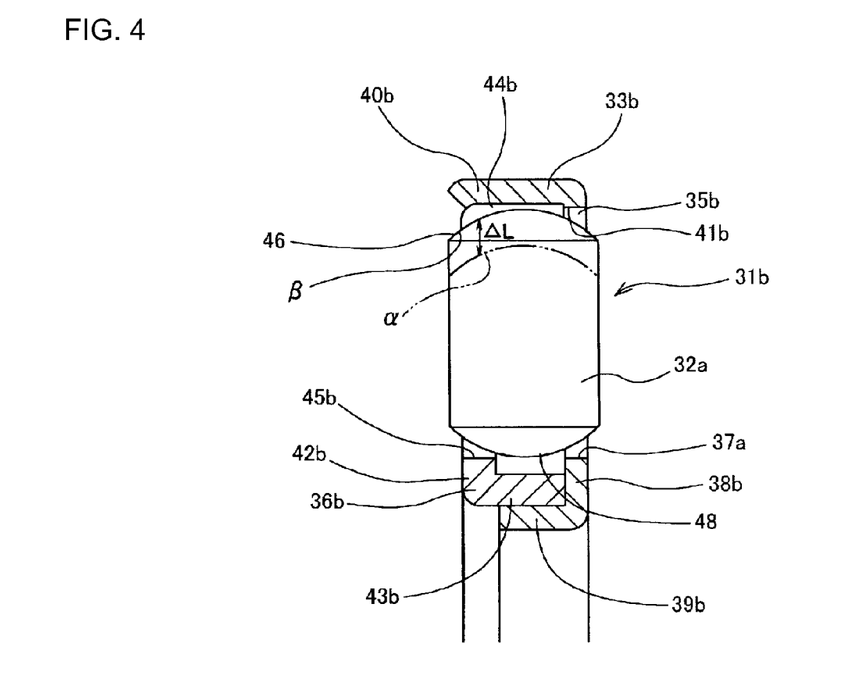
FIG. 4 is a partial cross-sectional view illustrating a third example of the first embodiment of the present invention.
Figure 5:
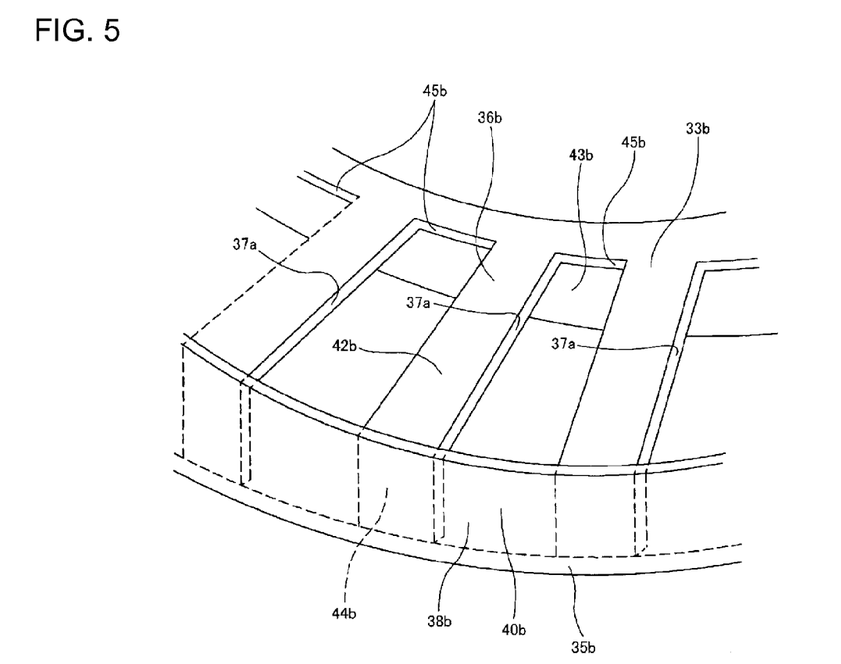
FIG. 5 is a partial perspective view illustrating the cage of the third example of the first embodiment of the present invention.

FIG. 4 and FIG. 5 illustrate a third example of the first embodiment of the present invention. In this example, portions which are located on part in the circumferential direction of the second outer-diameter side cylindrical section 44b that is formed on the outer circumferential edge section of the second cage element 36b on the outer-diameter side end sections of the pockets 37a are removed. Therefore, on the second outer-diameter side cylindrical section 44b, sections with material and sections with no material are alternately repeated, to form a notched cylindrical shape. The sections with no material are located at each of the outer-diameter side end sections of the pockets 37a.

With this construction, the end surface in the axial direction of the rollers 32a that are held inside the pockets 37a (outer-diameter side end sections in the radial direction of the cage 33b) are made to face the inner circumferential surface of the first outer-diameter side cylindrical section 40b. When the rollers 32a displace inside the pockets 37a to the outer-diameter side end sections in the radial direction of the cage 33b, the end surfaces of the rollers 32a come in contact with the inner circumferential surface of the first outer-diameter side cylindrical section 40b. In this example, the length dimension of the pockets 37a in the radial direction of the cage 33b, and also the dimension in the axial direction of the rollers 32a that are held inside these pockets 37a are increased by just the difference (ΔL) between the chain line a and solid line 13 in FIG. 4, which corresponds to the plate thickness of the second outer-diameter side cylindrical section 44b, making it possible to increase the load capacity of the roller thrust bearing. Preferably the shape of the first cage element 35b is also suitably improved such as by removing part in order to prevent interference with the rollers 32a. The construction and function of the other parts are the same as in the first example of the first embodiment.

Embodiment 1, Example 4

Figure 6:
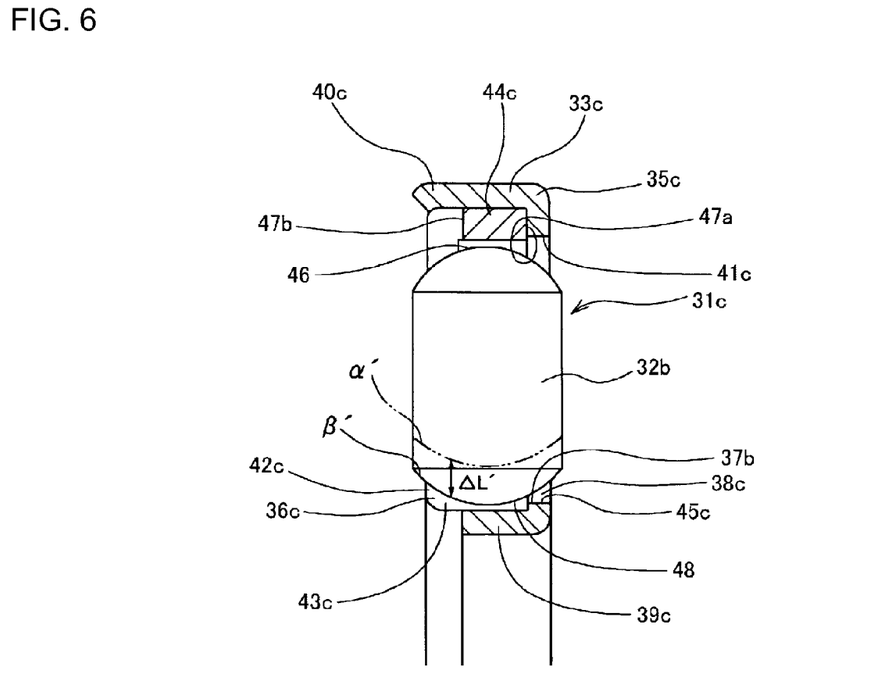
FIG. 6 is a partial cross-sectional view illustrating a fourth example of the first embodiment of the present invention.

FIG. 6 illustrates a fourth example of the first embodiment of the present invention. In this example, portions of part in the circumferential direction of the second inner-diameter side cylindrical section 43c that is formed on the inner circumferential edge section of the second cage element 36c that are located on the inner-diameter side end sections of the pockets 37b are removed. Therefore, on the second inner-diameter side cylindrical section 43c, sections with material and sections with no material are alternately repeated, forming a notched cylindrical shape. The sections with no material are located at the inner-diameter side end sections of the pockets 37b.

With this construction, the end surfaces in the axial direction of the rollers 32b that are held inside the pockets 37b (inner-diameter side end sections in the radial direction of the cage 33c) are caused to face the outer circumferential surface of the first inner-diameter side cylindrical section 39c. When the rollers 32b displace inside the pockets 37b to the inner-diameter side end sections in the axial direction of the cage 33c, the end surfaces of the rollers 32b come in contact with the outer circumferential surface of the first inner-diameter side cylindrical section 39c. In this example, the length dimension of the pockets 37b in the radial direction of the cage 33c, and also the dimension in the axial direction of the rollers 32b that are held inside these pockets 37b are increased by just the difference (ΔL') between the chain line α' and solid line β' in FIG. 6, which corresponds to the plate thickness of the second inner-diameter side cylindrical section 43c, making it possible to increase the load capacity of the roller thrust bearing. Preferably the shape of the first cage element 35c is also suitably improved such as by removing part in order to prevent interference with the rollers 32b. The construction and function of the other parts are the same as in the third example of the first embodiment.

Embodiment 2, Example 1

Figure 7:
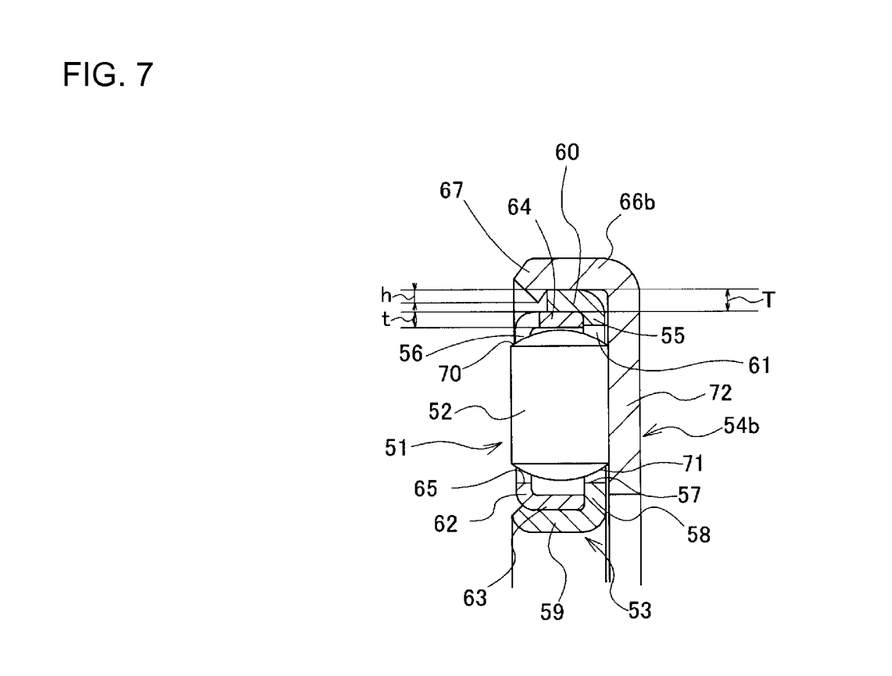
FIG. 7 is a partial cross-sectional view illustrating a first example of a second embodiment of the present invention.

FIG. 7 illustrates a first example of a second embodiment of the present invention. This second embodiment as well achieves construction that in addition to improving resistance to wear and the ability to endure concentrated stress in one of the cage elements by making the thicknesses of the metal plates of the first cage element 55 and second cage element 56 different, maintains the function of preventing the cage 53 from coming apart from the thrust race 54b, and suppressing the occurrence of harmful interference between the cage 53 and the thrust race 54b.

The thickness (t) of the metal plate of the second cage element 56 is less than the thickness (T) of the metal plate of the first cage element 55 (t<T). In this example, the thickness (t) of the metal plate of the second cage element 56 is about the same as in the conventional construction, and the thickness (T) of the metal plate of the first cage element 55 is about 1.2 to 2 times the thickness (t) (T=(1.2 to 2)t). In other words, the thickness (t) of the metal plate of the second cage element 56 is about ⅝ to ½ the thickness (T) of the metal plate of the first cage element 55. As an example, the thickness (T) of the metal plate of the first cage element 55 can be 0.5 mm, and the thickness (t) of the metal plate of the second cage element 56 can be 0.4 mm. However, as long as the strength and rigidity required for the second cage element 56 can be ensured, it is preferable that the thickness dimension (T) of the first cage element 55 be increased by the amount that the thickness (t) of the metal plate of the second cage element 56 is less than the thickness (T) of the metal plate of the first cage element 55. Therefore, preferably the thickness (t) of the metal plate of the second cage element 56 is ⅔ or less the thickness (T) of the metal plate of the first cage element 55, and even more preferably, in this example is ½ or less.

In this example as well, the first cage element 55 and the second cage element 56 are combined together to form the cage 53 by fitting the second outer-diameter side cylindrical section 64 inside the inner-diameter side of the first outer-diameter side cylindrical section 60 and fitting the second inner-diameter side cylindrical section 63 around the outer-diameter side of the first inner-diameter side cylindrical section 59. The cage 53 is then combined with the thrust race 54b so that the first annular disk section 58 of the first cage element 55 faces the race section 72 of the thrust race 54b. In this state, a fastening section 67 that is formed on the tip end edge of the flange section 66b of the thrust race 54b is located further on the opposite side in the axial direction from the race section 72 than the tip end edge of the first outer-diameter side cylindrical section 60, and due to the engagement with this tip end edge, prevents the cage 53 and the thrust race 54b from coming apart. The protruding amount (h) that the fastening section 67 protrudes from the inner circumferential surface of the flange section 66b is less than the thickness (T) of the first outer-diameter side cylindrical section 60 (h<T). Therefore, even when the inner circumferential surface of the flange section 66b comes in contact with the outer circumferential surface of the cage 53, the tip end of the fastening section 67 does not come in contact with (interfere with) the outer circumferential surface of the second cage element 56.

With the roller thrust bearing 51 with races of this example, it is possible to obtain a sufficient effect of preventing the thrust race 54b from coming apart from the cage 53, even in the case of a thin roller thrust bearing 51 in which it is difficult to make the thickness dimension of the metal plate of the cage 53 large. It is possible to prevent interference between the tip end section of the fastening section 67 and the outer circumferential edge section of the second cage element 56, and thus it is possible to suppress the occurrence of severe vibration and an increase in rotation resistance and wear due to that interference. Furthermore, it is possible to increase the freedom of construction of the assembly of the thrust race 54b without increasing the weight of the thrust race 54b, and it is possible to maintain the surface area of the flow path for lubrication oil.

Furthermore, the construction of this example can be suitably applied to uses wherein the amount of relative eccentricity of the rotating section becomes large, and in this case, it is possible to improve resistance to wear even when there is active interference between the flange section 66b of the thrust race 54b and the first outer-diameter side cylindrical section 60. In case that a thrust race 54a on the opposite side is provided, it is also possible to improve resistance to wear even when there is active interference between the thrust race 54a and the first inner-diameter side cylindrical section 59. Moreover, even when bending occurs in the first outer-diameter side cylindrical section 60 on the non-crimped side due to the first outer-diameter side cylindrical section 60 coming in contact with the thrust race 54b, it is possible to reduce the amount of bending, and it is possible to reduce concentrated stress in the continuous section between the first outer-diameter side cylindrical section 60 and the first annular disk section 58. The other construction and function are the same as in the first example of the first embodiment.

Embodiment 2, Example 2

Figure 8:
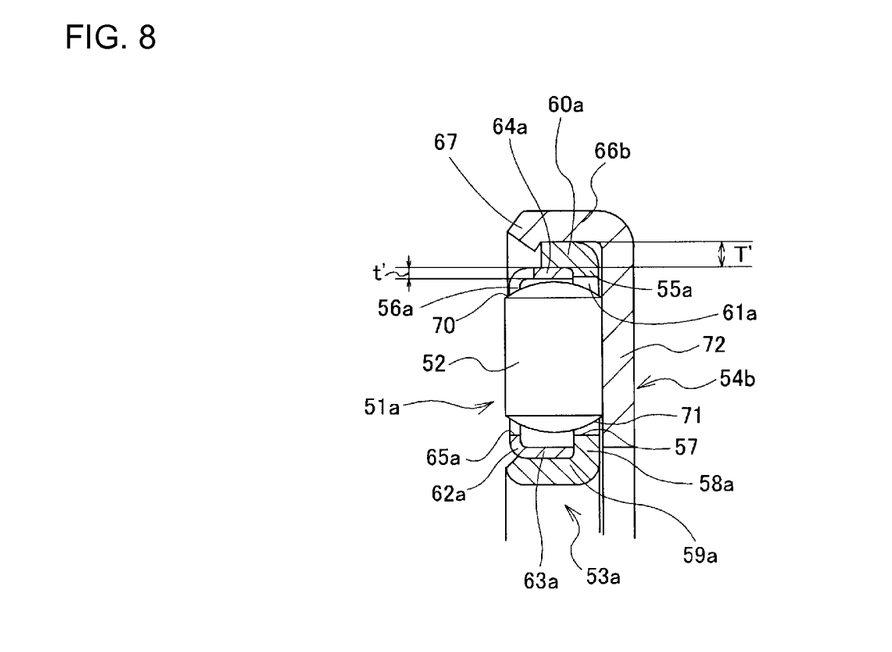
FIG. 8 is a partial cross-sectional view illustrating a second example of the second embodiment of the present invention.

FIG. 8 illustrates a second example of the second embodiment of the present invention. In this example, the thickness (t') of the metal plate of the second cage element 56a is less than in the conventional construction, and the thickness (T') of the metal plate of the first cage element 35a is increased by that amount. In this example, the thickness (T') of the metal plate of the first cage element 35a is 2 to 3 times the thickness (t') of the metal plate of the second cage element 36a (T'=(2 to 3)t').

In this example, by making the thickness (t') of the metal plate of the second cage element 36a thin up to the minimum necessary thickness, the dimension in the axial direction and the dimension in the radial direction of the cage 53a is kept about the same as in the conventional construction, and the engagement amount (overlap amount in the radial direction) between the fastening section 67 and the tip end edge of the first outer-diameter side cylindrical section 60a is maintained. The construction and function of the other parts are the same as in the first example of the second embodiment.

Embodiment 2, Example 3

Figure 9:
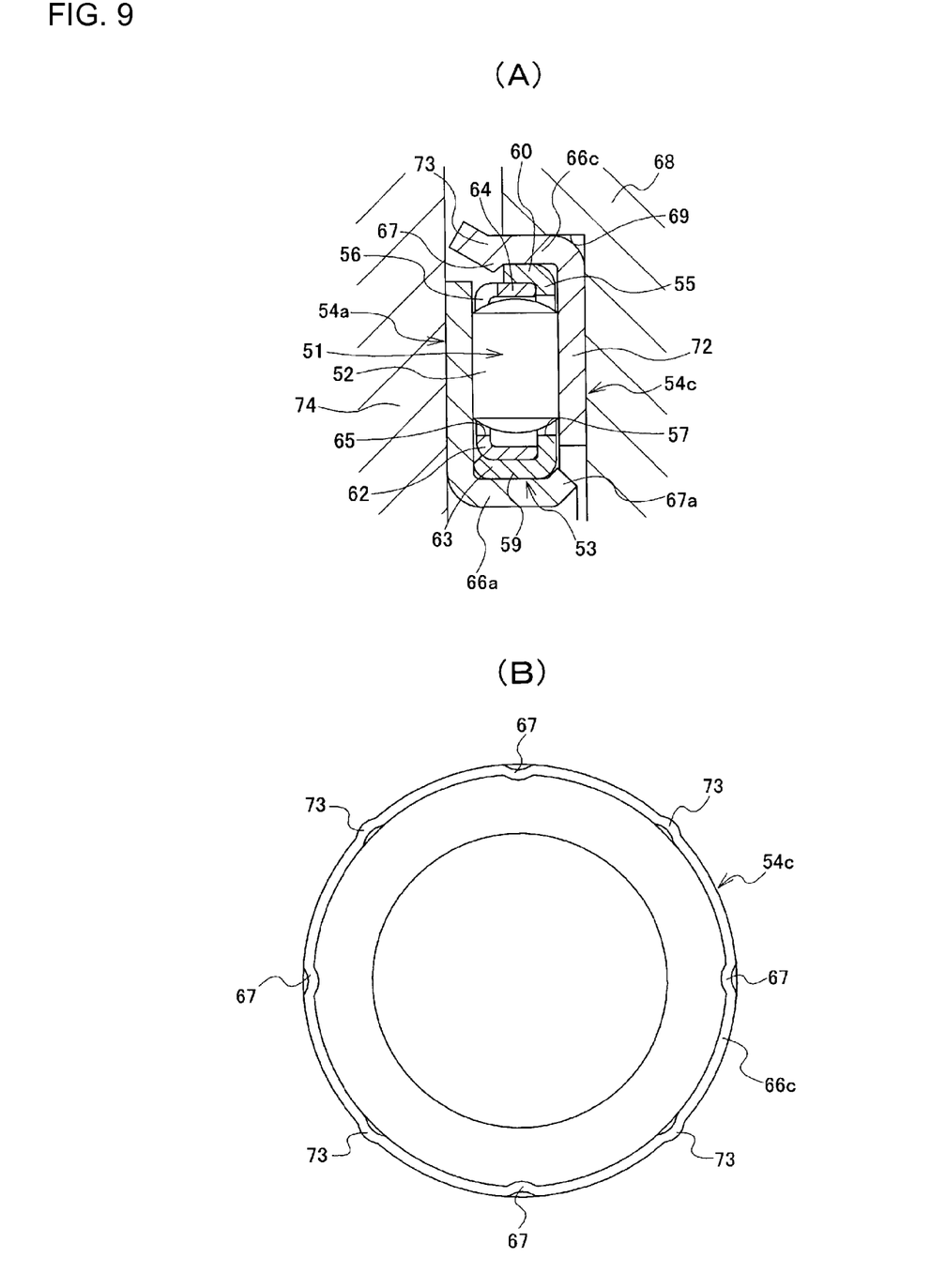
FIG. 9A is a partial cross-sectional view illustrating a third example of the second embodiment of the present invention.
FIG. 9B is an orthographic projection illustrating the state of the right thrust race in FIG. 9A as seen from the left side in FIG. 9A.

FIG. 9 illustrates a third example of the second embodiment of the present invention. In this example, the same roller thrust bearing 53 is used as in the first example of the second embodiment. As illustrated in FIG. 9B, in this example, a plurality of protrusions 73 that protrude outward in the radial direction and that preventing reverse installation of the bearing are provided at a plurality of locations in the circumferential direction of the tip end edge of the flange 66c of the thrust race 54c at positions where the phase in the circumferential direction is separated from that of the fastening sections 67. With this construction, it is possible to prevent the roller thrust bearing 53 from being assembled in the support section 69 of the casing 68 in the reverse direction from the proper state illustrated in FIG. 9A, and the occurrence of trouble such as covering the space between the casing 68 and the opposing member 74 and causing insufficient lubrication inside the thrust bearing 53 is prevented.

In this example, the thickness (T) of the first outer-diameter side cylindrical section 60 (see FIG. 7) is made to be large, and the protruding amount (h) of the fastening sections 67 (see FIG. 7) is made to be large. With this construction, even when the thickness in the axial direction of the overall roller thrust bearing 51 with race, which is the total of the thickness of the thrust race 54c and the diameter of a roller 52, is about 2.5 mm to 6 mm, which is on the lower limit side for being practical, it is possible to prevent the thickness of the first outer-diameter side cylindrical section 60 from becoming too small, and prevent the engagement amount of the fastening sections 67 and the first outer-diameter side cylindrical section 60 from becoming too small. Moreover, even though the protruding amount of the fastening sections 67 is large, interference between the tip end sections of the fastening sections 67 and the outer circumferential edge section of the second cage element 56 is prevented, and thus severe vibration, an increase in rotation resistance in the area of interference, or the occurrence of wear due to this interference is prevented. The construction and function of the other parts are the same as in the first example of the second embodiment.

INDUSTRIAL APPLICABILITY

The roller thrust bearing of the present invention is not limited to the rotation support section of a transmission for an automobile, and can also be applied to various kinds of rotation supports sections that rotate at high speed while supporting thrust loads. Moreover, the roller thrust bearing of the present invention can also be applied to uses such as a torque converter wherein the amount of relative eccentricity between two members of the rotating section is large. The form to be employed can be suitably selected according to whether to handle trouble due to the rotating section rotating at high speed, or to handle trouble due to the a large amount of relative eccentricity.

EXPLANATION OF REFERENCE NUMBERS 1, 1a, 1b Roller thrust bearing
2, 2a Roller
3, 3a, 3b Cage
4a, 4b Thrust race
5, 5a, 5b First cage element
6, 6a, 6b Second cage element
7, 7a Pocket
8, 8a, 8b First annular disk section
9, 9a, 9b First inner-diameter side cylindrical section
10, 10a, 10b First outer-diameter side cylindrical section
11, 11a, 11b First through hole
12, 12a, 12b Second annular disk section
13, 13a, 13b Second inner-diameter side cylindrical section
14, 14a, 14b Second outer-diameter side cylindrical section
15, 15a, 15b Second through hole
16a, 16b Flange section
17a, 17b, 17c Fastening section
18 Casing
19 Support section
19a Rear surface
20 Opposing member
20a End surface
21, 21a Outer-diameter side end surface
22a, 22b Outer-diameter side circumferential edge section
23 Inner-diameter side end surface
24 Contact area
25 Race section
31, 31a, 31b, 31c Roller thrust bearing
32, 32a, 32b Roller
33, 33a, 33b, 33c Cage
35, 35a, 35b, 35c First cage element
36, 36a, 36b, 36c Second cage element
37, 37a, 37b Pocket
38, 38a, 38b, 38c First annular disk section
39, 39a, 39b, 39c First inner-diameter side cylindrical section
40, 40a, 40b, 40c First outer-diameter side cylindrical section
41, 41a, 41b, 41c First through hole
42, 42a, 42b, 42c Second annular disk section
43, 43a, 43b, 43c Second inner-diameter side cylindrical section
44, 44a, 44b, 44c Second outer-diameter side cylindrical section
45, 45a, 45b, 45c Second through hole
46 Outer-diameter side end surface
47a, 47b Outer-diameter side circumferential edge section
48 Inner-diameter side end surface
51, 51a Roller thrust bearing
52, 52a Roller
53, 53a Cage
54a, 54b, 54c Thrust race
55, 55a First cage element
56, 56a Second cage element
57 Pocket
58, 58a First annular disk section
59, 59a First inner-diameter side cylindrical section
60, 60a First outer-diameter side cylindrical section
61, 61a First through hole
62, 62a Second annular disk section
63, 63a Second inner-diameter side cylindrical section
64, 64a Second outer-diameter side cylindrical section
65, 65a Second through hole
66a, 66b, 66c Flange section
67, 67a Fastening section
68 Casing
69 Support section
70 Outer-diameter side end surface
71 Inner-diameter side end surface
72 Race section
73 Protrusion for preventing reverse assembly
74 Opposing member

What is claimed is:

1. A roller thrust bearing comprising:
a cage that comprises:
a first cage element that is formed by bending a metal plate and comprises a first annular disk section in which first through holes that are long in the radial direction are formed at a plurality of locations in the circumferential direction thereof; a first inner-diameter side cylindrical section that is formed around the inner circumferential edge of the first annular disk section; and a first outer-diameter side cylindrical section that is formed around the outer circumferential edge of the first annular disk section; and
a second cage element that is formed by bending a metal plate and comprises a second annular disk section in which second through holes that are long in the radial direction are formed at a plurality of locations in the circumferential direction thereof so as to have the same pitch as the first through holes; a second inner-diameter side cylindrical section that is formed around the inner circumferential edge of the second annular disk section; and a second outer-diameter side cylindrical section that is formed around the outer circumferential edge of the second annular disk section;
the first cage element and the second cage element being combined together in the axial direction such that the first through holes and second through holes are aligned in the axial direction, the second outer-diameter side cylindrical section fits inside the inner-diameter side of the first outer-diameter side cylindrical section, and the second inner-diameter side cylindrical section fits around the outer-diameter side of the first inner-diameter side cylindrical section; and
a plurality of rollers each of which is placed respectively in a plurality of pockets that are formed by the first through holes and second through holes of the cage so as to be able to roll freely; and
the first inner-diameter side cylindrical section, the first outer-diameter side cylindrical section and the first annular disk section have the same plate thickness, and the second inner-diameter side cylindrical section, the second outer-diameter side cylindrical section and the second annular disk section have the same plate thickness, and the thickness of the metal plate of the first cage element being less than the thickness of the metal plate of the second cage element, or the thickness of the metal plate of the second cage element being less than the thickness of the metal plate of the first cage element.

2. The roller thrust bearing according to claim 1, wherein at least one end surface of two end surfaces in the axial direction of each of the rollers which is located on the outer-diameter side of the cage is a partial spherical shaped convex surface whose center of curvature is located on the center axis of the rollers, the second through holes in the second cage element are formed up to the outer circumferential edge of the second annular disk section, and when the rollers are displaced in the radial direction of the cage, only the center section of the outer-diameter side end surface of each of the rollers comes in contact with the inner circumferential surface of the second outer-diameter side cylindrical section.

3. The roller thrust bearing according to claim 1 wherein the thickness of the metal plate of the first cage element is or less than the thickness of the metal plate of the second cage element.

4. A roller thrust bearing with a race, comprising:
the roller thrust bearing according to claim 1; and
at least one thrust race that is assembled so as to be able to rotate freely relative to the cage, and so as not to come apart from the cage,
the at least one thrust race that is formed by bending a hard metal plate and comprises: an annular disk shaped race section; a cylindrical shaped flange section that is formed around the outer circumferential edge of the race section, and fastening sections that are formed so as to protrude inward in the radial direction from a plurality of locations in the circumferential direction around the tip end edge of the flange section, the diameter of the inscribed circle thereof being less than the outer diameter of the cage; and
the first annular disk section of the first cage element facing the race section of the at least one thrust race, and the fastening sections being located further on the opposite side in the axial direction from the race section than the tip end edge of the first outer-diameter side cylindrical section of the first cage element;
the thickness of the metal plate of the second cage element being or less than the thickness of the metal plate of the first cage element; and
the protrusion amount that the fastening sections protrude from the inner circumferential surface of the flange section being less than the thickness of the first outer-diameter side cylindrical section.

5. The roller thrust bearing with race according to claim 4, wherein at least one end surface of two end surfaces in the axial direction of each of the rollers which is located on the outer-diameter side of the cage is a partial spherical shaped convex surface whose center of curvature is located on the center axis of the rollers, the second through holes in the second cage element are formed up to the outer circumferential edge of the second annular disk section, and when the rollers are displaced in the radial direction of the cage, only the center section of the outer-diameter side end surface of each of the rollers comes in contact with the inner circumferential surface of the second outer-diameter side cylindrical section.

6. The roller thrust bearing with race according to claim 4 wherein a plurality of protrusions that protrude outward in the radial direction and that are for preventing reverse assembly are provided at a plurality of locations in the circumferential direction of the tip end edge of the flange section such that the phase in the circumferential direction thereof is separated from that of the fastening sections.

7. The roller thrust bearing with race according to claim 4 wherein the total of the thickness of the thrust race and the diameter of the roller is in the range from 2.5 mm to 6 mm.

8. A roller thrust bearing, comprising:
a cage that comprises:
a first cage element that is formed by bending a metal plate and comprises a first annular disk section in which first through holes that are long in the radial direction are formed at a plurality of locations in the circumferential direction thereof; a first inner-diameter side cylindrical section that is formed around the inner circumferential edge of the first annular disk section; and a first outer-diameter side cylindrical section that is formed around the outer circumferential edge of the first annular disk section; and
a second cage element that is formed by bending a metal plate and comprises a second annular disk section in which second through holes that are long in the radial direction are formed at a plurality of locations in the circumferential direction thereof so as to have the same pitch as the first through holes, a second inner-diameter side cylindrical section that is formed around the inner circumferential edge of the second annular disk section; and a second outer-diameter side cylindrical section that is formed around the outer circumferential edge of the second annular disk section;
the first cage element and the second cage element being combined together in the axial direction such that the first through holes and second through holes are aligned in the axial direction, the second outer-diameter side cylindrical section fits inside the inner-diameter side of the first outer-diameter side cylindrical section, and the second inner-diameter side cylindrical section fits around the outer-diameter side of the first inner-diameter side cylindrical section; and
a plurality of rollers each of which is placed respectively in a plurality of pockets that are formed by the first through holes and second through holes of the cage so as to be able to roll freely; and
the first inner-diameter side cylindrical section, the first outer-diameter side cylindrical section and the first annular disk section have the same plate thickness, and the second inner-diameter side cylindrical section, the second outer-diameter side cylindrical section and the second annular disk section have the same plate thickness, and
the thickness of the first inner-diameter side cylindrical section and the first outer-diameter side cylindrical section of the first cage element is less than the thickness of the second inner-diameter side cylindrical section and the second outer-diameter side cylindrical section of the second cage element, or the thickness of the second inner-diameter side cylindrical section and second outer-diameter side cylindrical section of the second cage element is less than the thickness of the first inner-diameter side cylindrical section and the first outer-diameter side cylindrical section of the first cage element.

* * * * *